Jan. 24, 1956 F. X. LANDREY Re. 24,113

SHIP LOADING AND TRIMMING MACHINE

Original Filed Dec. 7, 1951 3 Sheets-Sheet 1

INVENTOR.
Francis X. Landrey
BY
Mann, Brown & Hansmann
Attys.

SHIP LOADING AND TRIMMING MACHINE

Original Filed Dec. 7, 1951 3 Sheets-Sheet 2

INVENTOR.
Francis X. Landrey
BY
Mann, Brown & Hausmann
Attys.

SHIP LOADING AND TRIMMING MACHINE

Original Filed Dec. 7, 1951 3 Sheets-Sheet 3

INVENTOR.
Francis X. Landrey
BY
Mann, Brown & Hansmann
Attys.

United States Patent Office

Re. 24,113
Reissued Jan. 24, 1956

24,113

SHIP LOADING AND TRIMMING MACHINE

Francis X. Landrey, South Portland, Maine, assignor to Stephens-Adamson Mfg. Co., a corporation of Illinois Original No. 2,687,798, dated August 31, 1954, Serial No. 260,475, December 7, 1951. Application for reissue May 17, 1955, Serial No. 509,130

3 Claims. (Cl. 198—128)

Matter enclosed in heavy brackets [ ] appears in the original patent but forms no part of this reissue specification; matter printed in italics indicates the additions made by reissue.

This invention relates to means for loading ships with pulverulent material, and has for its principal object to provide a simple machine that can be supported by the fall rope of a derrick when in use, and can be readily transported from pier to pier as the ship loading may require.

Generally speaking, this is accomplished by mounting a motor driven thrower at the delivery end of a chute and providing the assembly with a single point of support for connection with the fall rope of the derrick.

Further objects and advantages of the invention will appear as the disclosure proceeds and the description is read in connection with the accompanying drawings, in which Fig. 1 is a side elevation of the machine;

Figure 1:
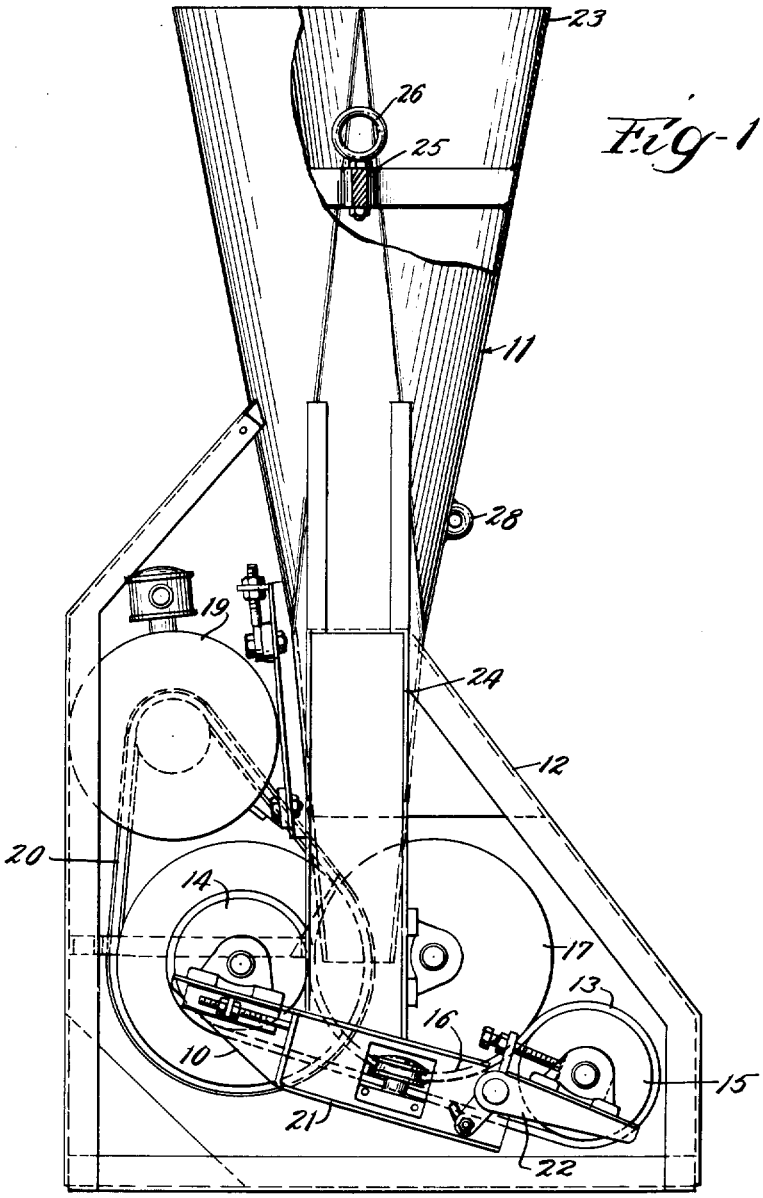

In these drawings, the thrower is indicated generally by the reference numeral 10, the chute or feed hopper by the reference numeral 11, and the main frame by which the two are assembled together by the reference numeral 12.

The thrower includes a belt 13 running over a driven pulley 14 and an idler pulley 15. The lower run of the belt is substantially straight, as shown. The upper run is forced into a concavity 16 by two narrow wheels or pulleys 17 spaced apart to provide a passageway 18 for the material being thrown.

The pulley 14 is driven by a motor 19 through a V-belt drive 20.

The thrower apparatus is all assembled on a thrower frame 21, and it is provided with an adjustable sub-frame 22 for the idler pulley 15 by which the angle of the delivery may be varied.

The chute or feed hopper 11 includes a conical or generally funnel-shaped receiving portion 23 which blends into a rectangular delivery portion 24 adapted to deliver the material to be loaded onto the concavity 16 in a position to preserve the falling speed of that material and thus facilitate the throwing.

Figure 2:
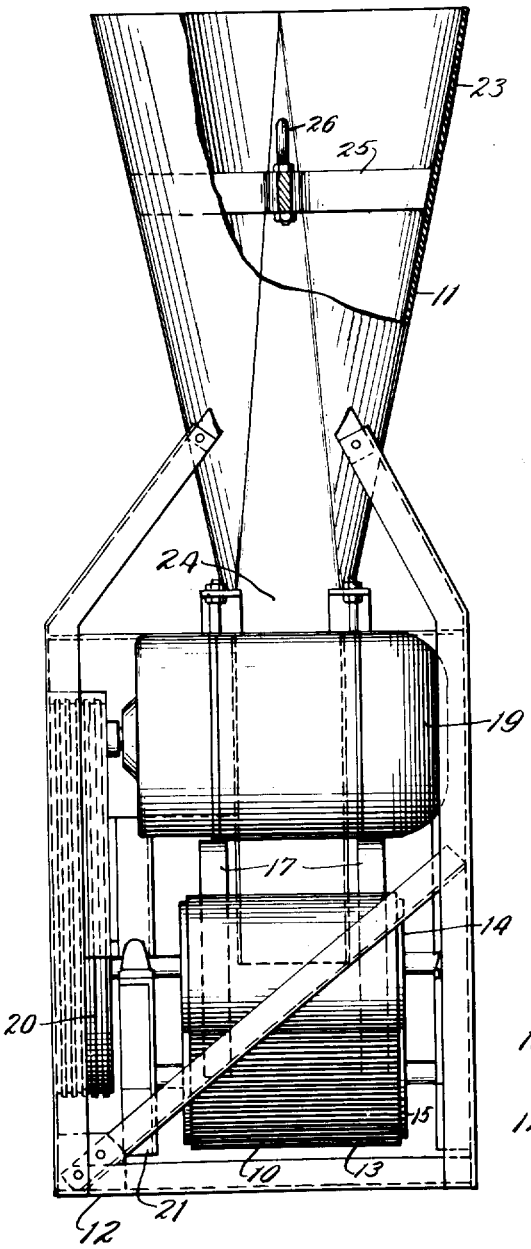
Fig. 2 is an end elevation looking from the left in Fig. 1.
Figure 4:
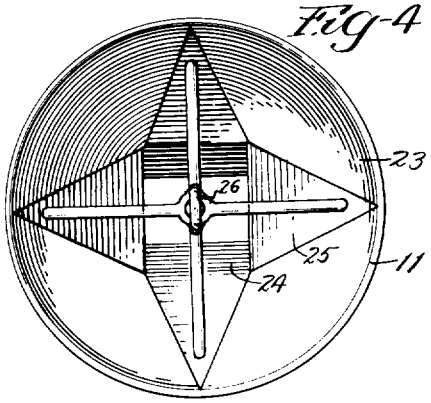
Fig. 4 is a plan view of the chute.
Figure 3:
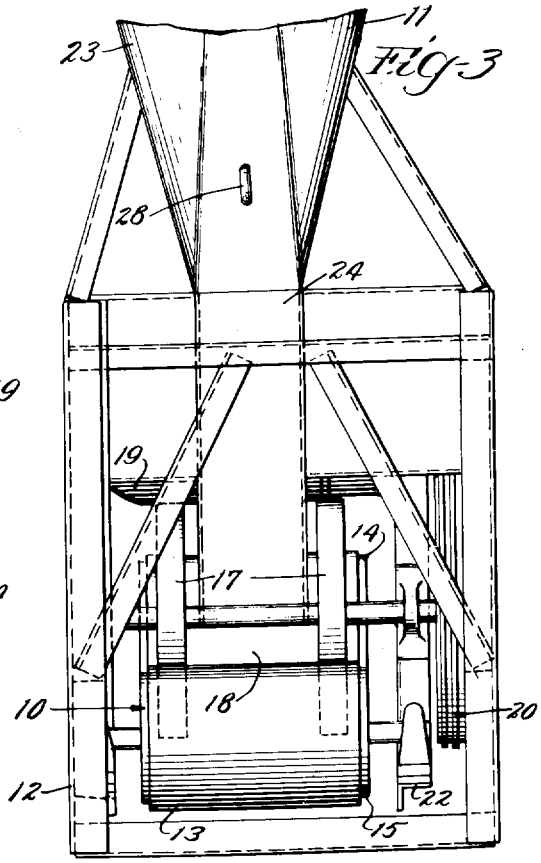
Fig. 3 is an end elevation looking from the right in Fig. 1.

The chute and the thrower are mounted in and connected by the main frame 12, which is fabricated from commercial sections and forms a base on which the machine may stand upright, as shown in Figs. 1, 2, and 3, or on which it may lie on its side at the left in Fig. 1.

The chute is provided with a transversely arranged bar or beam 25 extending across the receiving end of the funnel and provided with an eye 26 at the mid portion adapted to receive the hook of a fall rope 27 for supporting and handling the machine in use.

The chute also is provided with an eye 28 to receive the hook of the same or another fall rope for turning the machine on its side for transport or standing it up in preparation for use.

Figure 5:
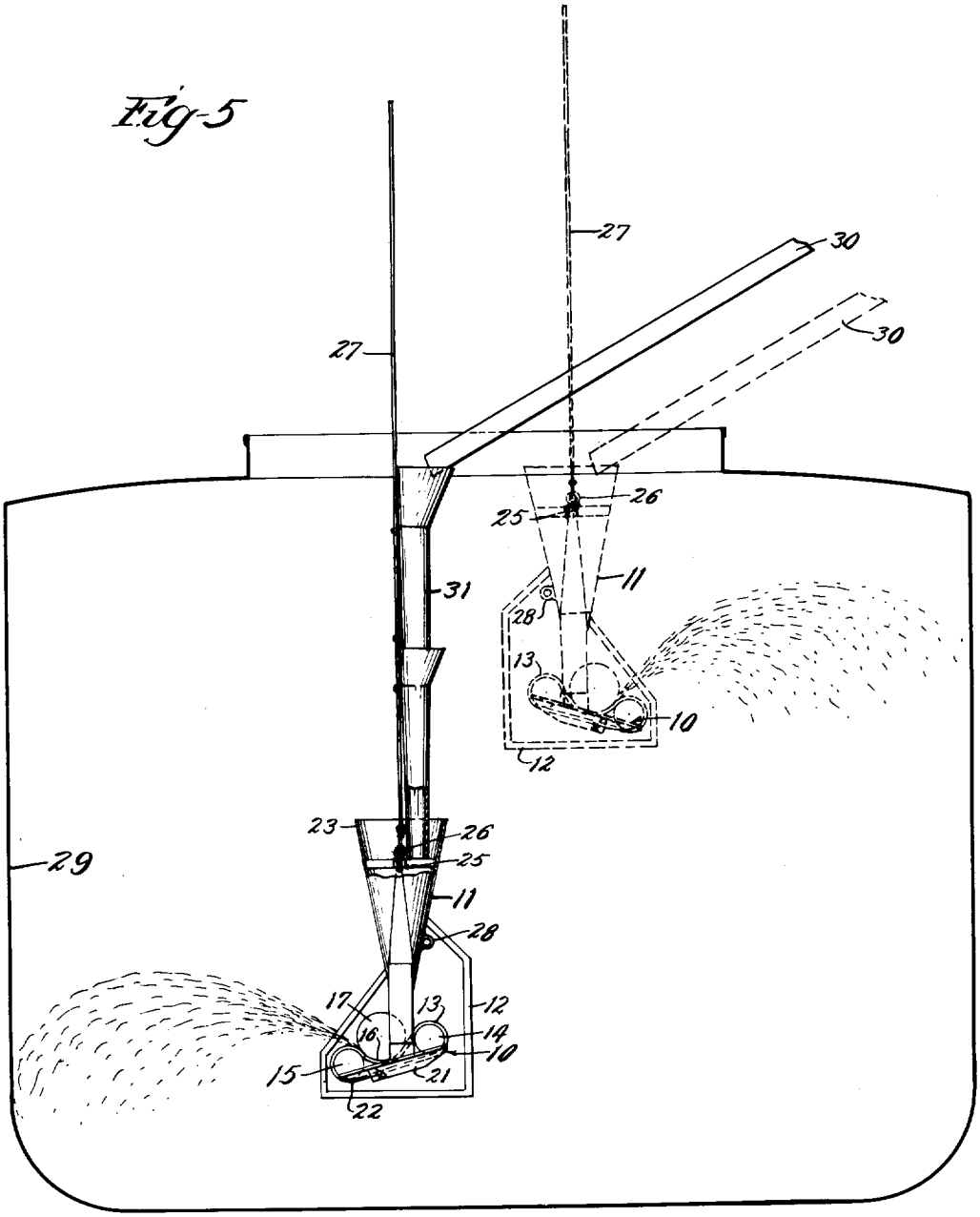
Fig. 5 is a diagram showing the machine in different positions in a ship.

In Fig. 5, the solid line position shows the machine in the lower portion of the hold of a ship 29, which is adjacent to a pier equipped with material handling conveyors, etc., including a spout 30. It will often be convenient to introduce an auxiliary chute 31 made fast to the fall rope 27 and having its lower end resting on the bar 25, or otherwise supported in position to deliver into the chute 11.

As the ship is loaded, the machine will be raised, and will reach a position in which the auxiliary chute 31 may be dispensed with, as indicated in dotted lines in Fig. 5.

The thrower may be of various forms, but preferably such as disclosed in the patents to Sinden No. 2,125,088, July 26, 1938, and 2,467,634, April 19, 1949, the disclosures of which patents are hereby incorporated by reference.

In one form that has been found satisfactory, the machine is driven by a 15 horsepower motor with 3600 R. P. M. The frame has a base approximately 4'3" by 3'5¾", and the overall height is 12'. The thrower has a delivery speed of 2800 feet per minute, and may be adjusted between 10 and 40 degrees.

In operation, the machine is picked up by the fall rope of a derrick and lowered into the hatch of a ship substantially as indicated in Fig. 5, and the thrower set in operation. The bulk material delivered by the spout will then be given a suitable trajectory of delivery into the hold for trimming the ship, and the machine may be rotated about the axis of the fall rope 27 to direct the thrower for placing and distributing the material in the hold. It can be rotated through 360 degrees without interfering with the normal operation.

In ships having a lengthwise dividing partition, it can be rotated through 180 degrees at each side of the partition.

The single point of support for the assembly on the fall rope is preferably approximately in line with the center of gravity, though that can be varied to offset the reaction of the thrower.

Heretofore, 40 men have been a normal complement for loading and trimming a grain ship, such as a Victory or Liberty ship, whereas with a machine embodying this invention eight men with two in the hold for an hour at a time will load the same ship with the same amount in one-half the time, and the working conditions are very much better.

*One of the salient features of the invention is that the assembly may be rotated 360 degrees or more without having to move the feed chute or spout, for instance, spout 30 of Figure 5, and without spillage of the material flowing from the feed chute or spout to the feed hopper 11, due to supporting cables, chains or the like passing therebetween to interrupt or deflect to flow. This is because the single point of support for the assembly is on, or substantially on, the axis of chute or feed hopper 11, and at a substantial distance down inside it, as clearly shown in the drawings, so that the delivering end of the feed spout or chute may be received within the hopper, between the fall rope 27 and the side of the hopper, in any position of the assembly with respect to the feed chute or spout. It will also be noted that the configuration of the top of the feed hopper 11 is such that the lower end of the feed spout or chute, for instance, spout 30, may be maintained in material delivering position between the supporting rope 27 and the side of the hopper as the assembly moves through its possible range of movement about the rope.*

*Thus, the assembly may be rotated 360 degrees without interference with or requiring movement of the feed*

*spout or chute and without affecting in any way the flow of material into the chute or feed hopper 11.*

I claim:

1. In a machine for loading bulk material into the hold of a ship, a thrower including a frame, pulleys journaled on horizontal axes fixed in the frame, a conveyor belt trained around said pulleys, a chute adapted to receive the material to be loaded and deliver it to the belt, and a motor driving the belt for projecting said delivered material in the form of a stream in a single direction, means supporting the thrower frame rigidly on and below the chute, and a fastening element mounted on the chute in [substantially the axis] *substantial alignment with the axis* thereof for attachment to a single line fall rope supporting the machine whereby the machine may be hung from a derrick and rotated manually about the axis of the fall rope by an operator grasping the frame of the thrower, *said fastening element comprising a spider element secured within said chute and a substantial distance down inside it.*

2. The combination claimed in claim 1, in which [the upper portion of the chute is provided with] *said spider*

*element comprises* a transverse bar and [the fastening element is] *said fastening element comprises* an eye upstanding from said bar.

3. The combination claimed in claim 1, including an auxiliary chute supported in position to deliver to the first named chute and having connections aligned along its wall for securing it to the fall rope.

References Cited in the file of this patent or the original patent

UNITED STATES PATENTS

| | | |
|---|---|---|
| 243,327 | Toepfer | June 21, 1881 |
| 1,331,020 | MacLennan | Feb. 17, 1920 |
| 1,389,402 | Vogel | Aug. 30, 1921 |
| 2,205,155 | Reed | June 18, 1940 |
| 2,318,881 | Mundy | May 11, 1943 |
| 2,467,634 | Sinden | Apr. 19, 1949 |

FOREIGN PATENTS

| | | |
|---|---|---|
| 658,401 | France | June 4, 1929 |